June 17, 1941.  R. A. SCHULTZ  2,245,612
FRONT WHEEL DRIVE ASSEMBLY
Filed Aug. 15, 1938  3 Sheets-Sheet 3
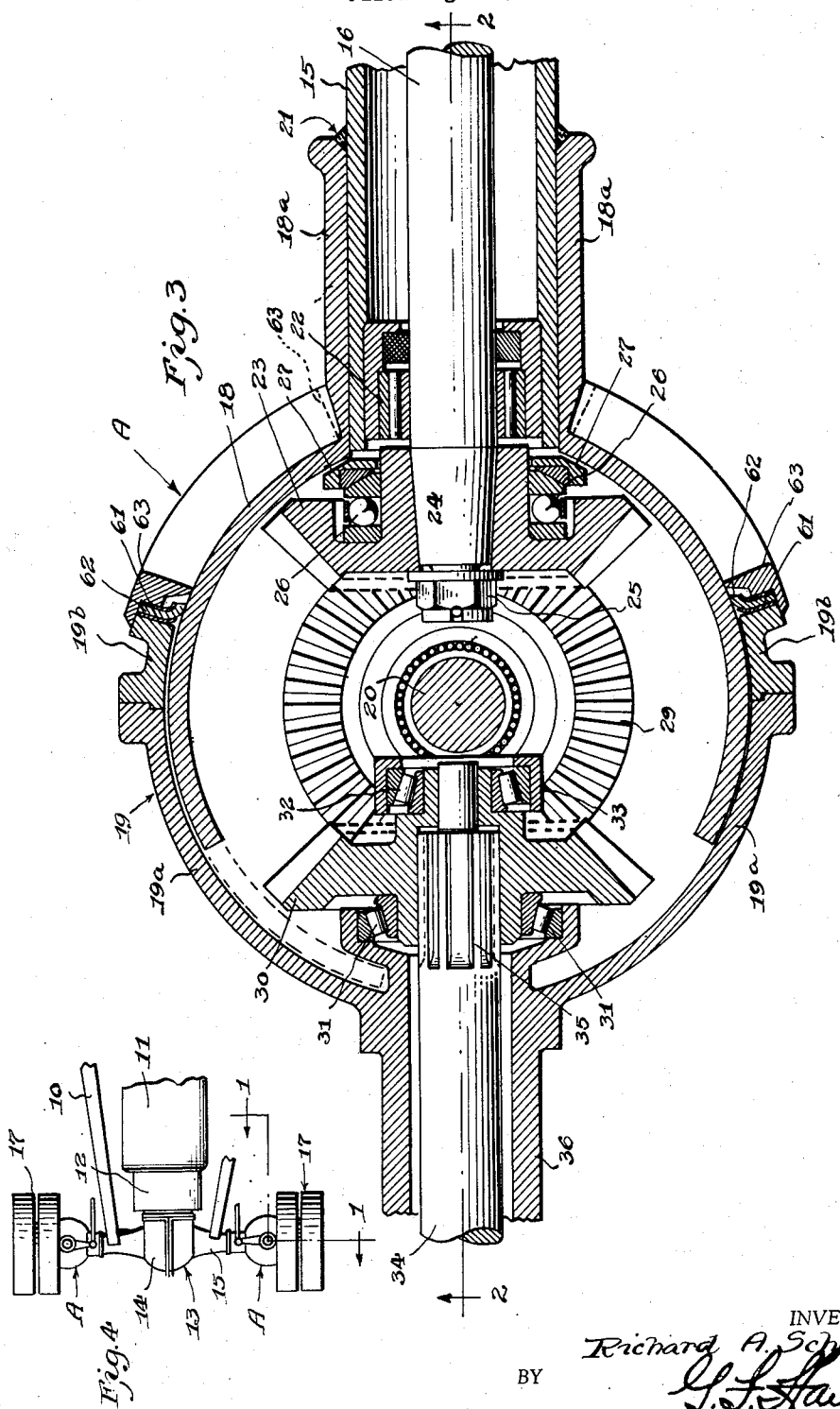
INVENTOR.
Richard A. Schultz
BY
ATTORNEY.

Patented June 17, 1941

2,245,612

UNITED STATES PATENT OFFICE 2,245,612

FRONT WHEEL DRIVE ASSEMBLY

Richard A. Schultz, Roseville, Mich., assignor, by mesne assignments, to Friend Motor Company, St. Clair Shores, Mich., a corporation of Michigan Application August 15, 1938, Serial No. 224,924

6 Claims. (Cl. 180—43)

My invention relates to a front wheel drive assembly for vehicles and more particularly to an improved gearing arrangement and means for assembling same in a compact unitary structure.

Various difficulties have been encountered in the past in the manufacture of front wheel drive mechanisms, principally because these prior art structures are complicated, are assembled together with much tedious efforts, are not readily serviced and are, as well, rather expensive to produce.

An object of my present invention is to provide an improved front wheel drive assembly by incorporating in a unitary assembly, a construction providing a compact assembly and which may be economically manufactured and serviced with a minimum of time and labor.

Another object of my invention is to provide a rugged and serviceable front wheel drive assembly of the character described, by providing a gear housing assembly comprising a pair of telescoping relatively movable gear housing structures suitably hinged together and incorporating a thrust bearing intermediate said structures to provide a rugged drive of the full floating type.

Another object of my invention is to provide a front wheel drive assembly which can be readily serviced with a minimum of expense by providing adjusting means operable from without the housing structure.

Other objects of my invention relate to various improved structural features of the assembly which cooperate together to provide a new and novel assembly of compact size, and which is adapted for ready assembly with a standard type of vehicle.

For a further understanding of my invention, reference may be had to the accompanying drawings illustrating a preferred embodiment of my invention, and in which:

Fig. 3 is a plan sectional view thereof taken substantially on the line 3—3 of Fig. 2, and Fig. 4 is a diagrammatic plan view of my front wheel drive assembly.

Figure 1:
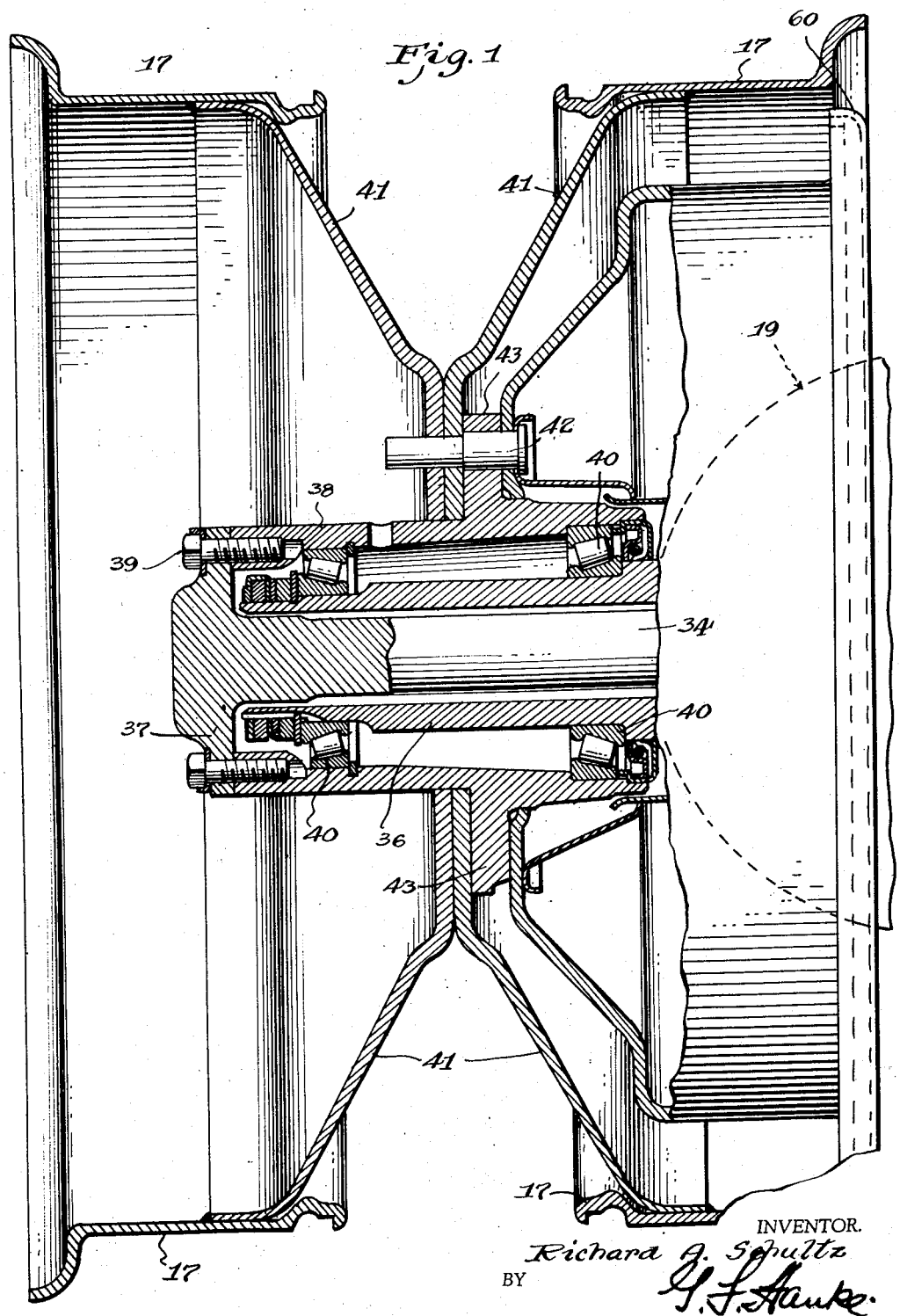
Fig. 1 is a fragmentary detail view of a front wheel drive showing parts thereof in section, and taken on the line 1—1 of Fig. 4.

Some of the structural details shown and described in the present application have been claimed in my co-pending application for U. S. Letters Patent, Serial No. 224,923, filed August 15, 1938.

My invention may be incorporated with a vehicle of substantially standard design, such a vehicle including a chassis frame 10, an engine 11, a conventional transmission and clutch assembly 12, a differential 13 including a differential housing 14 to which is secured the axle housing 15. The front wheel drive assembly indicated as a whole by the reference character A transmits the engine power from the drive axle 16 to the wheels 17.

My improved front wheel drive assembly A comprises in general a pair of telescoped inner and outer gear housing structures 18 and 19, which structures are preferably constructed substantially spherical and are hinged together by the king pin 20 to have relative movement. The inner housing structure 18 preferably has formed therewith an integral tubular extension 18a which is permanently secured to the axle housing 15 such as by welding as at 21. The end of said axle housing supports the main axle bearing 22 permitting longitudinal adjustment of said axle shaft.

The beveled driving gear 23 is secured to the tapered end portion 24 of said axle shaft by a nut or other suitable securing means, and is positively driven thereby. The driving member includes a self-aligning thrust bearing 26 which is in turn engaged by a collar 27, relatively adjustable with respect to the gear housing structure 18 by means of a plurality of adjusting screws 28. This self-aligning thrust bearing compensates for any misalignment caused by inaccurate adjustment of said adjusting screws. Thus the driving gear, carrying with it the axle shaft, is adjusted relative to the intermediate beveled idler gear 29 carried by the king pin 20 to provide the exact amount of operating clearance between these gears.

Figure 2:
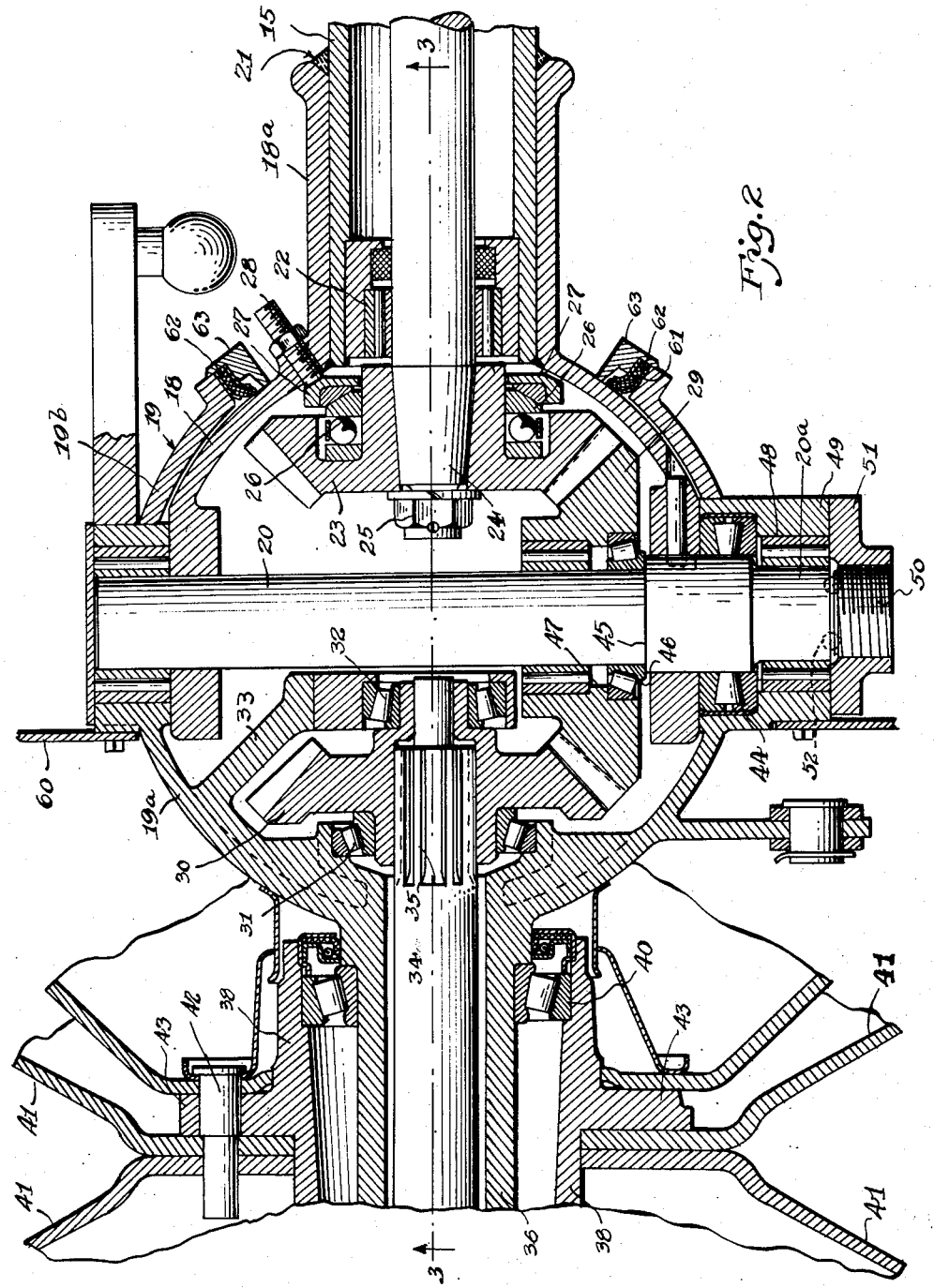
Fig. 2 is a vertical sectional view of the front wheel drive gear assembly taken substantially on the line 2—2 of Fig. 3.

The intermediate idler gear 29 in turn engages the beveled driven gear 30 which is supported in suitable anti-friction bearings 31 and 32 respectively carried by the outer gear housing structure 19. The latter bearing 32 is preferably carried by a bracket 33 integrally formed with the housing 19 and extending substantially radially inwardly as clearly shown in Fig. 2.

This driven gear 30 is keyed or splined to the driven shaft 34 as at 35, which driven shaft extends longitudinally through the hollow tubular extension 36 integrally formed with the gear housing structure 19. This shaft 34 carries a flange 37 which is secured to the wheel hub 38 by bolts 39 or other suitable securing means, said hub 38 being supported on the anti-friction bearings 40 carried externally of the extension 36.

A pair of wheels 41 are secured as at 42 to the hub flange 43 and it will be noted that this construction is of the full floating type. The two telescoped housing structures 18 and 19 have interposed therebetween a thrust bearing 44 (see Fig. 2) whereby to provide a rugged full floating type assembly.

The king pin 20 which hinges the gear housing structures together, is supported by the inner fixed housing structure 18. To remove the outer housing, the king pin 20 is first removed together with the bearing 48 and nut 51. The driven gear is removed with the outer housing. The idler gear 29 thus rests on the extension carried by the inner housing and when the king pin is again assembled, the idler gear supported thereby is again brought into the proper adjustment relative to the driving gear 23 and driven gear 30. Thus all gears are replaced in the same relative positions as before.

The adjustment of said intermediate idler gear 29 is had by relatively adjusting the king pin 20 with respect to the housing structures. The king pin 20 is provided with a shoulder 45 arranged to engage a thrust bearing 46 that in turn engages a shoulder 47 of this intermediate idler gear 29. The lower end portion 20a of the king pin is slidably supported in the bearing 48 carried in a boss 49 of the housing (preferably the movable outer housing structure 19), is axially slidable in said thrust bearing 44, and is moved axially by means of an adjusting screw 50 preferably adjustably supported in a cap or cover 51 suitably secured to said boss 49. Balls or other suitable anti-friction devices 52 are preferably interposed between the end face of the king pin 20 and the inner face of said adjusting screw 50 to facilitate adjustment of said king pin. Thus the king pin, and carrying with it the intermediate idler gear 29, is relatively adjusted with respect to the driving and driven gears. It will be noted that all the adjusting screws for adjusting these gears are accessible from without the gear housing, and adjustments of said gears can be made without disassembling the gear housing structures.

When the king pin and idler gear carried thereby are once adjusted, this assembly of the king pin 20, cap 51 and adjusting screw 50 can be removed from the front wheel drive assembly in its entirety and replaced again in which event the relative adjustment of the idler gear with respect to the driving and driven gears will be the same as before removal, since the pin 20 on being replaced is located by the abutting of the cap or nut 51 with the outer housing 19a, thus locating again the idler gear by reason of the shoulder 45 which engages the bearing 46 that carries the idler gear 29.

In the present construction, the wheel brake cover plate 60 is secured to the movable gear housing structure 19, and therefore is moved with said wheels. In order to facilitate assembly of the outer gear housing structure 19 to the inner housing structure, this outer structure is formed of two complementary sections 19a and 19b secured together by any suitable securing means; in other words, said outer movable housing structure is formed of a pair of complementary semi-spherical shells. The rear portion or section 19b is provided with an elongated opening 61, about whose peripheral edge is secured a sealing element 62 yieldingly engaging the outer surface of the fixed inner structure 18, said sealing element being held in place by a clamping frame 63. The axle housing and extension 18a which is permanently united to the axle housing projects through the opening 61 and the opening which is elongated in the plane of movement of said movable portions of the assembly is so constructed and arranged as to permit a turning of the movable housing structure through a maximum arc.

My present construction provides a front wheel drive assembly that is practical to manufacture, is also economically produced and further, the construction is such as to make it practically possible to very readily adjust the gearing, thereby facilitating maintenance and original assembly with a minimum of time and labor. My construction is rugged and is capable of withstanding extremely heavy loads, the full floating feature together with the thrust bearing intermediate the relatively movable housings permitting the carrying of dual driving wheels.

It will be apparent to those skilled in the art to which my invention pertains that various modifications and changes may be made therein without departing from the spirit of my invention or from the scope of the appended claims.

I claim:

1. A front wheel drive assembly comprising relatively movable inner and outer housing structures, driving and driven gears supported in said inner and outer structures respectively, a pin hinging said structures, an intermediate idler gear supported by said pin in driving connection with said driving and driven gears, and means longitudinally adjusting said pin whereby to adjustably urge said idler gear toward said driving and driven gears.

2. A front wheel drive assembly comprising relatively movable inner and outer housing structures, driving and driven gears supported in said inner and outer structures respectively, a pin hinging said structures, said pin having a shoulder, an intermediate idler gear supported by said pin and resting on said shoulder, and means longitudinally adjusting said pin and urging said shoulder against said idler gear to adjustably urge said idler gear toward said driving and driven gears in operative driving relation therewith.

3. A front wheel drive assembly including a housing comprising a pair of substantially spherical telescoping relatively movable inner and outer housing structures, an axle housing secured to one of said structures, a wheel secured to the other, means hinging said structures, gearing means within said housing and including a driving gear, a driven gear and an intermediate idler gear, the inner surfaces of said structures constructed substantially spherical in contour, and bearings for said driving and driven gears, said driven gear bearing spaced from the inner spherical surface of said outer housing structure and carried by a bearing support extending inwardly from the internal spherical surface of said outer structure whereby to permit said inner structure to move into the space between the said bearing and outer housing structure on moving said outer structure relatively to the inner structure.

4. A front wheel drive assembly including a housing comprising a pair of substantially spherical telescoping relatively movable inner and outer housing structures, an axle housing secured to one of said structures, a wheel secured to the other, means hinging said structures, gearing means within said housing and including a driving gear, a driven gear and an intermediate idler gear, the inner surfaces of said structures constructed substantially spherical in contour, and bearings for said driving and driven gears, said driven bearing spaced from the inner spherical surface of said outer housing structure and carried by a bearing support extending inwardly from the internal spherical surface of said outer structure whereby to permit said inner structure to move into the space between the bearing and outer housing structure on moving said outer structure relatively to the inner structure, said inner structure extending intermediate said driven gear bearing support and the internal surface of said outer structure only when said structures are moved a maximum amount relative to each other.

5. A front wheel drive assembly including a housing comprising a pair of substantially spherical telescoping relatively movable inner and outer housing structures, an axle housing secured to one of said structures, a wheel secured to the other, means hinging said structures, gearing means within said housing and including a driving gear, a driven gear and an intermediate idler gear, the inner surfaces of said structures constructed substantially spherical in contour, and bearings for said driving and driven gears, said driven gear bearing carried by a bearing support extending inwardly from the internal spherical surface of said outer structure whereby to clear said inner structure on moving said outer structure relatively to the inner structure, said outer structure having a segmental spherical recess intermediate the driven gear bearing support and the internal surface of said outer structure to receive a portion of said inner structure when said structures are moved a maximum amount relative to each other.

6. A front wheel drive assembly including a housing comprising inner and outer housing structures, a king pin for hinging said structures together, driving and driven gears supported within said housing, an intermediate idler gear carried by said king pin, said king pin having a shoulder, an anti-friction bearing supported on said shoulder, said idler gear supported on said anti-friction bearing, the outer housing structure having an antifriction bearing for supporting said king pin, and a plug adjustably secured to said outer housing structure and constructed for abutting engagement with the lower end of said king pin, said plug adjusted to locate said king pin and thereby adjust said idler gear toward said driving and driven gears to take up excessive clearance between the idler gear and said driving and driven gears caused by gear tooth wear.

RICHARD A. SCHULTZ.